United States Patent Office 3,449,608
Patented June 10, 1969

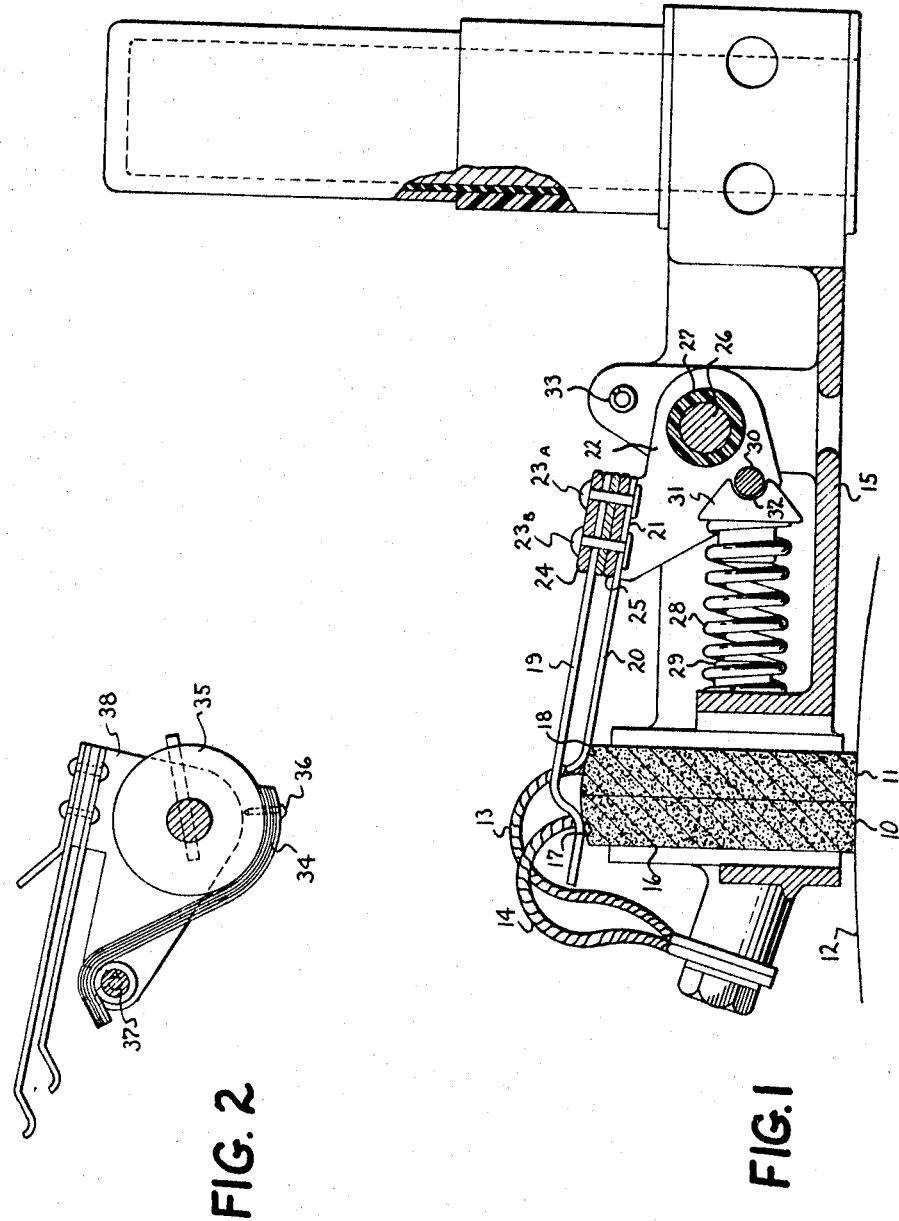

3,449,608
BRUSH HOLDER
Howard J. McLean, North Palm Beach, Fla., assignor to General Electric Company, a corporation of New York
Filed Jan. 25, 1966, Ser. No. 522,947
Int. Cl. H01r 39/40; H02k 13/10
U.S. Cl. 310—246                         7 Claims

ABSTRACT OF THE DISCLOSURE

A brush holder assembly for a dynamoelectric machine having a support member with an opening to guide two brushes arranged in tandem. A pivotally mounted crank member has first and second spring arms attached in cantilever fashion with the free end of one bearing on the top of one of the brushes and the free end of the other bearing on the top of the other brush. A spring means acts on the crank member and urges its rotation in a direction to cause the free ends of the spring arms to urge the brushes into contact with the commutator of the dynamoelectric machine.

---

The present invention relates to brush holders for dynamoelectric machines and more particularly to brush holders wherein two brushes arranged in tandem act as a single brush of the dynamoelectric machine.

In dynamoelectric machines in which the usual single brush has been replaced by two brushes in tandem, a biasing arrangement must be provided to urge each of the brushes against a current collecting device. As a practical matter, the biasing arrangement should be able to provide variable forces on the brushes to compensate for unequal wearing. While arrangements purportedly accomplishing this are known, they include linkage mechanisms connecting the springs which bear on the tandem brushes. These linkage mechanisms are undesirably complex, thus increasing the cost of manufacturing and maintaining them. The mechanisms prevent easy access to the brushes for maintenance or replacement purposes and thus add further to the cost of maintaining the machine on which they are used. Additionally, even where the linkage mechanisms functioned perfectly, the forces exerted on the brushes were not equal because one of the springs was more yielding than the other.

It is accordingly one of the objects of the present invention to provide a simplified brush holder in which the biasing forces exerted on tandem brushes will be automatically varied to compensate for unequal wearing of brushes and in which no linkage is needed between biasing springs.

It is a further object of my invention to provide in one embodiment an improved brush holder in which biasing springs may be pivoted clear of the brushes so as to facilitate access to the brushes for maintenance or replacement purposes.

To fulfill these and other objects, the present invention, in one embodiment, includes a support member having a guide means or opening in which two brushes arranged in tandem may be slidably mounted and a pivotally mounted crank member to which first and second spring arms are attached in cantilever fashion. The free end of one of the spring arm bears on one of the brushes and the free end of the other spring arm bears on the other brush. A spring acts on the crank member and urges its rotation in a direction which brings the free ends of the first and second spring arms to bear upon the brushes so as to urge the brushes toward contact with the current collecting device of a dynamoelectric machine.

Although the specification concludes with claims particularly pointing out and distinctly claiming the subject matter regarded as the present invention, the invention itself may be better understood by referring to the following detailed description in conjunction with the accompanying drawing in which:

FIGURE 1 is a side view, partially in section, of a brush holder constructed in accordance with the teachings of the present invention; and FIGURE 2 is a side view of a bell crank of the type used in the present invention showing the use of an alternate form of crank-rotating spring.

Referring now to FIGURE 1, there will be seen a pair of tandem brushes 10 and 11 which contact the surface of a current collector 12 and function as a single brush during the operation of a dynamoelectric machine. The brushes 10 and 11 may be electrically connected to the circuit of the machine through conductors 13 and 14 in any suitable manner. The holder for brushes 10 and 11 includes a support member 15 having a guide means with an opening 16 therein for receiving brushes 10 and 11 and for guiding them into contact with current collecting devices 12 of the dynamoelectric machine. Although the brushes are shown touching each other in FIGURE 1, they may be separated by a partition or spacing plate within the opening 16 so as to eliminate friction between them.

The brush 10 is urged against the surface of the current collecting device 12 by the free end 17 of a stiff spring arm 19. Similarly, brush 11 is urged against the device 12 by the free end 18 of a stiff spring arm 20. Both of the spring arms 19 and 20 are mounted in cantilever fashion on a flange at an extremity 21 of a bell crank 22 and may be secured thereto in any suitable manner such as by rivets 23a and 23b. Since the arms 19 and 20 are in vertical alignment and are essentially parallel, spacers 24 and 25 may be provided at the mounting flange to separate the spring arms so the movements of one arm will not interfere with the movements of the other. The bell crank 22 is mounted on a non-conducting annular bearing 27 which surrounds a pivot pin 26 on the support member 15. The bearing has a dual function. First, it electrically isolates the bell crank and the spring arms 19 and 20 from the remainder of the brush holder. Second, it prevents binding between the bell crank 22 and the pivot pin 26 which might prevent rotational movement of the crank. Alternatively, the spring arms 19 and 20 may be electrically insulated from the bell crank 22 so that bearing 27 need not be of a nonconducting material.

Spring arms 19 and 20 are arranged to exert a force on the top of their respective brushes 10 and 11. To this end, means are provided to urge rotation of bell crank 22. In the arrangement shown in FIGURE 1, bell crank 22 is urged to rotate counterclockwise by a compressed helical spring 28 having one end seated around a post 29 on support member 15 and the other end bearing upon a projection 30 on bell crank 22 through a head 31 mounted at that end of the spring. The head 31 includes a semi-circular notch 32 at its tip which partially surrounds the projection 30. The action of the spring 28 against the projection 30 may give rise to essentially constant counterclockwise moment if the moment arm through which the spring 28 acts is increased as the spring begins to exert less force due to its elongation. The moment arm is the distance between the pivot pin 26 and the line of action of the spring measured along a perpendicular from the line of action to the pivot pin. As the projection 30 rotates with the bell crank, this moment arm increases. The dimensions of the crank and the location of the projection 30 are such that the product of the increasing moment arm and the decreasing spring force; i.e., the moment developed by the spring, will remain substantially constant.

The counterclockwise moment generated by the spring 28 should be large enough to bend or deflect the spring arms 19 and 20 from their unstressed positions when they are resting against the tops of brushes 10 and 11. Due to their natural resiliency, the stressed arms will act to urge the brushes 10 and 11 into contact with current collector 12. It is desirable that arms 19 and 20 should be equally stressed when they are equally deflected from their unstressed positions. To this end the section moment of inertia of the spring arms 19 and 20 is proportioned as a function of the length so that the application of equal forces to the free ends of the spring arms results in equal deflections thereof. If the spring arms are of the same width this purpose may be readily accomplished by making the thickness thereof proportional to the length. For example, since the longer arm 19 will bend more readily than the shorter arm 20, the arm 19 must be made proportionally thicker than arm 20 so that it will be stressed to the same extent as is arm 20 when both are deflected the same amount. Otherwise, the natural tendency of arm 19 to bend will cause it to be stressed less than arm 20 if both are deflected the same amount.

If the brushes 10 and 11 are to wear down at the same average rate, the stressed arms 19 and 20 must exert varying forces on them to compensate for short term unequal wearing. For example, if brush 10 begins to wear faster than brush 11, the spring arm 20 should cause the force on brush 11 to be increased until the two brushes are equally long and are wearing at the same rate. Naturally, if the brushes are wearing equally, the forces exerted by the spring arms 19 and 20 should be equal so as to cause continued equal wearing.

Since the stress on each spring arm is proportional to its deflection, it is clear that if one of the arms is deflected less than the other it will be less stressed than the other. For example, if brush 10 begins to wear faster than brush 11, the spring arm 19 will begin to lose deflection relative to the deflection of spring arm 20. Arm 19 will become less stressed and will cause a lower clockwise moment to be exerted on the crank. However, at any one time the sum of the clockwise moments developed in spring arms 19 and 20 must be equal in magnitude to the counterclockwise moment caused by the helical spring 28. If the moment developed in spring arm 19 is decreased due to the decreased deflection of arm 19, the moment developed in spring arm 20 must be increased. Since the moment arm through which the force on spring arm 20 does not change, the amount of stress or force in that arm must increase to cause the increased moment. The increased stress causes brush 11 to be urged against device 12 with a greater force than is brush 10. Brush 11 will natrurally wear more rapidly than brush 10 under these conditions. After brush 11 has worn down the same extent as brush 10, the deflection of the spring arms 19 and 20 will once again be equal so that the forces which they exert on the brushes will also be equal.

It will be seen in FIGURE 1 that the projection 30 is located below the pivot pin 26 so that spring 28 causes counterclockwise forces to be exerted on the bell crank 22. In order to move the spring arms 19 and 20 away from the brushes 10 and 11, the bell crank is pivoted manually in a clockwise direction until the projection 30 is above the pivot pin 26. In this position, spring 28 will force the bell crank to rotate in a clockwise direction until it reaches a stopping pin 33. When the crank 22 is against the stop 33, the ends 17 and 18 of the spring arms 19 and 20 are clear of the ends of brushes 10 and 11. These brushes may then be removed for maintenance or replacement without any interference from the biasing arrangement. It should be noted that no mechanical latches are necessary to keep th spring arms out of the way since spring 28 will hold the crank 22 against the stop 33 until the crank can be manually rotated in a counterclockwise direction.

Of course, other spring arrangements might also be used to bias the spring arms 19 and 20 against the brushes 10 and 11. For example, in FIGURE 2 there is shown a bell crank 38 biased by a constant force-type spring 34. The salient characteristic of such a spring is that the predetermined force which it exerts does not vary as the spring moves. Spring 34 is secured to as circular segment 35 of a support member by a suitable fastener 36 at its right end. The left end of spring 34 bears down on a projection 37 on the bell crank 38 and causes the crank to be urged in a counterclockwise direction. Although spring 34 differs physically from the compressed helical spring 28 used in the embodiment shown in FIGURE 1, it operates to urge rotation of the bell crank to thereby causes biasing of the brushes in substantially the same manner.

While there has been described at present what is considered to be a preferred embodiment of the present invention, it is recognized that many modifications will occur to those skilled in the art. Accordingly, it is intended that the following claims shall cover all such variations and modifications as fall within the true spirit and scope of the invention.

What I claim as new and desire to secure by Letters Patent of the United States is:

1. A brush holder comprising:
   (a) a support member having an opening in which two brushes in tandem may be slidably mounted;
   (b) a bell crank member pivotally mounted at a point spaced from said guide means;
   (c) a first spring arm mounted in cantilever fashion on said crank member and having a free end overlying one of the brushes;
   (d) a second spring arm also mounted in cantilever fashion on said crank member having a free end overlying the other of the brushes;
   (e) spring means acting on said bell crank member operative to urge rotation thereof in a first direction which causes the free ends of said first and second spring arms to be urged against their respective underlying brushes; and
   (f) said first and second spring arms having unequal lengths and the section moment of inertia of said first and second spring arms being proportioned as a function of their length so that the application of equal forces to the free ends of said spring arms results in equal deflection of the arms.

2. A brush holder as recited in claim 1 wherein said first and second spring arms are mounted adjacent one another in cantilever fashion at the same extremity on said bell crank.

3. A brush holder as recited in claim 2 wherein said first and second spring arms are vertically aligned.

4. A brush holder as recited in claim 1 wherein the thickness of said first and second spring arms is proportional to their length so that the application of equal forces to the free ends of the spring arms results in equal deflection of the arms.

5. A brush holder as recited in claim 1 wherein the spring means comprises a compressed helical spring acting on said bell crank through a moment arm, the length of which varies inversely with the degree of compression of the spring whereby the moment exerted on the bell crank remains substantially constant.

6. A brush holder as recited in claim 1 wherein said spring means comprises a leaf spring of the constant force type operative to exert a predetermined constant force on said bell crank regardless of its own movement while urging rotation of the bell crank.

7. A brush holder comprising:
   (a) a support member having an opening therethrough in which two brushes in tandem may be slidably mounted;
   (b) a crank member pivotally mounted on said support member at a point spaced from the opening and having a projection thereon radially spaced from the pivot point, said crank being movable about its pivot point in first and second directions of rotation;
   (c) a first spring arm mounted in cantilever fashion on said crank member and having a free end overlying one of the brushes;

(d) a second spring arm mounted in cantilever fashion on said crank member in vertical alignment with said first spring arm and having a free end overlying the other of the brushes;

(e) spring means having its first end anchored on said support member and its second end bearing against said projection, said spring means acting to urge said first and second spring arms against the brushes when said crank moves in the first direction of rotation and away from said brushes when said crank moves in the second direction of rotation; and f) said first and second spring arms having unequal lengths and the section moment of inertia of said first and second spring arms being proportioned as a function of their length so that the application of equal forces to the free ends of said spring arms results in equal deflection of the arms.

References Cited

UNITED STATES PATENTS

| | | | |
|---|---|---|---|
| 1,934,350 | 11/1933 | Hartman | 310—246 |
| 1,936,422 | 11/1933 | Burnham | 310—246 |
| 3,132,273 | 5/1964 | Pernetta | 310—246 |

WARREN E. RAY, *Primary Examiner.*